United States Patent
Chih et al.

(10) Patent No.: US 10,909,669 B2
(45) Date of Patent: Feb. 2, 2021

(54) CONTRAST ADJUSTMENT SYSTEM AND CONTRAST ADJUSTMENT METHOD

(71) Applicant: Realtek Semiconductor Corporation, Hsinchu (TW)

(72) Inventors: Chung-Yan Chih, Taipei (TW); Kai Liu, Taipei (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/733,344

(22) Filed: Jan. 3, 2020

(65) Prior Publication Data
US 2020/0334797 A1 Oct. 22, 2020

(30) Foreign Application Priority Data
Apr. 16, 2019 (TW) .............................. 108113261 A

(51) Int. Cl.
*G06T 5/40* (2006.01)
*G06T 5/00* (2006.01)

(52) U.S. Cl.
CPC ................ *G06T 5/40* (2013.01); *G06T 5/008* (2013.01)

(58) Field of Classification Search
CPC ........................................................ G06T 5/40
USPC .......................................................... 382/270
See application file for complete search history.

(56) References Cited

U.S. PATENT DOCUMENTS

| | | | |
|---|---|---|---|
| 8,009,907 B1 | 8/2011 | Srinivasan et al. | |
| 8,345,038 B2* | 1/2013 | Kerofsky | G09G 3/3406 345/214 |
| 2007/0036456 A1* | 2/2007 | Hooper | G06T 5/008 382/274 |
| 2007/0172145 A1* | 7/2007 | Altunbasak | H04N 5/20 382/274 |
| 2011/0273748 A1* | 11/2011 | Kobayashi | G06T 5/008 358/448 |

(Continued)

FOREIGN PATENT DOCUMENTS

TW 201308997 A 2/2013

OTHER PUBLICATIONS

Ooi et al.; "Quadrants Dynamic Histogram Equalization for Contrast Enhancement"; Nov. 2010; IEEE Transactions on Consumer Electronics; vol. 56, No. 4; pp. 2552-2559 (Year: 2010).*

(Continued)

*Primary Examiner* — David T Welch
(74) *Attorney, Agent, or Firm* — Locke Lord LLP; Tim Tingkang Xia, Esq.

(57) ABSTRACT

A contrast adjustment system includes a memory and a processor. The memory stores instructions. The processor is configured to access and execute the instructions to: access an image with a plurality of pixels, wherein the pixels are corresponding to a plurality of intensity values; generate a histogram based on a distribution of the intensity values in a range from an intensity lower bound to an intensity upper bound; divide the histogram into four sub-histograms based on a median value of the intensity values; enlarge the four sub-histograms based on a predetermined parameter; remap the four sub-histograms to form a gamma curve based on a cumulative distribution function; and apply the gamma curve to pixels of another image.

16 Claims, 10 Drawing Sheets

(56) References Cited

U.S. PATENT DOCUMENTS

| | | | |
|---|---|---|---|
| 2015/0294180 A1* | 10/2015 | Hong | G06K 9/4661 |
| | | | 382/168 |
| 2016/0189354 A1* | 6/2016 | Kikuchi | G06T 7/136 |
| | | | 382/167 |
| 2018/0204111 A1* | 7/2018 | Zadeh | G06K 9/3233 |

OTHER PUBLICATIONS

Chen Hee Ooi et al., "Quadrants Dynamic Histogram Equalization for Contrast Enhancement", IEEE Transactions on Consumer Electronics, vol. 56, No. 4, Nov. 2010, p. 2552-p. 2559.

* cited by examiner

CONTRAST ADJUSTMENT SYSTEM AND CONTRAST ADJUSTMENT METHOD

CROSS-REFERENCE TO RELATED APPLICATION

This application claims priority to Taiwan Application Serial Number 108113261, filed on Apr. 16, 2019, which is herein incorporated by reference.

BACKGROUND

Technical Field

The present disclosure relates to an electric system and a control method. More particularly, the present disclosure relates to a system and a method for adjusting contrast of images.

Description of Related Art

Current histogram equalizations are performed on an entire image, and are unable to be performed with reference to some specific areas in the image for further enhancement. Moreover, some deficiencies may present in a progress of the current histogram equalizations.

SUMMARY

Some aspects of the disclosure relate to a contrast adjustment system that includes memory and a processor. The processor is coupled to the memory. The memory stores instructions. The processor is configured to access and execute the instructions to: access a first image having a plurality of first pixels, in which the plurality of first pixels are corresponding to a plurality of intensity values; generate a histogram based on a distribution of the plurality of intensity values in a range from an intensity lower bound to an intensity upper bound; divide the histogram into four sub-histograms based on a median value of the plurality of intensity values; enlarge the four sub-histograms based on at least one predetermined parameter; remap the four sub-histograms based on a cumulative distribution function, in order to form a gamma curve for adjusting the plurality of intensity values; and apply the gamma curve to a plurality of second pixels in a second image.

Some aspects of the disclosure relate to a contrast adjustment method performed by a processor accessing at least one instruction from a memory and executing the least one instruction. The contrast adjustment method includes the following operations: accessing a first image having a plurality of first pixels, in which the plurality of first pixels are corresponding to a plurality of intensity values, respectively; generating a histogram based on a distribution of the plurality of intensity values in a range from an intensity lower bound to an intensity upper bound; dividing the histogram into four sub-histograms based on a median value of the plurality of intensity values: enlarging the four sub-histograms based on at least one predetermined parameter; remapping the four sub-histograms based on a cumulative distribution function, in order to form a gamma curve for adjusting the plurality of intensity values: and applying the gamma curve to a plurality of second pixels in a second image.

BRIEF DESCRIPTION OF THE DRAWINGS

FIGS. 4A-48 are schematic diagrams showing histograms according to some embodiments of present disclosure.

FIG. 5 is a schematic diagram showing histograms according to some embodiments of present disclosure.

FIG. 8 is a schematic diagram showing gamma curves according to some embodiments of present disclosure.

DETAILED DESCRIPTION

Figure 1:
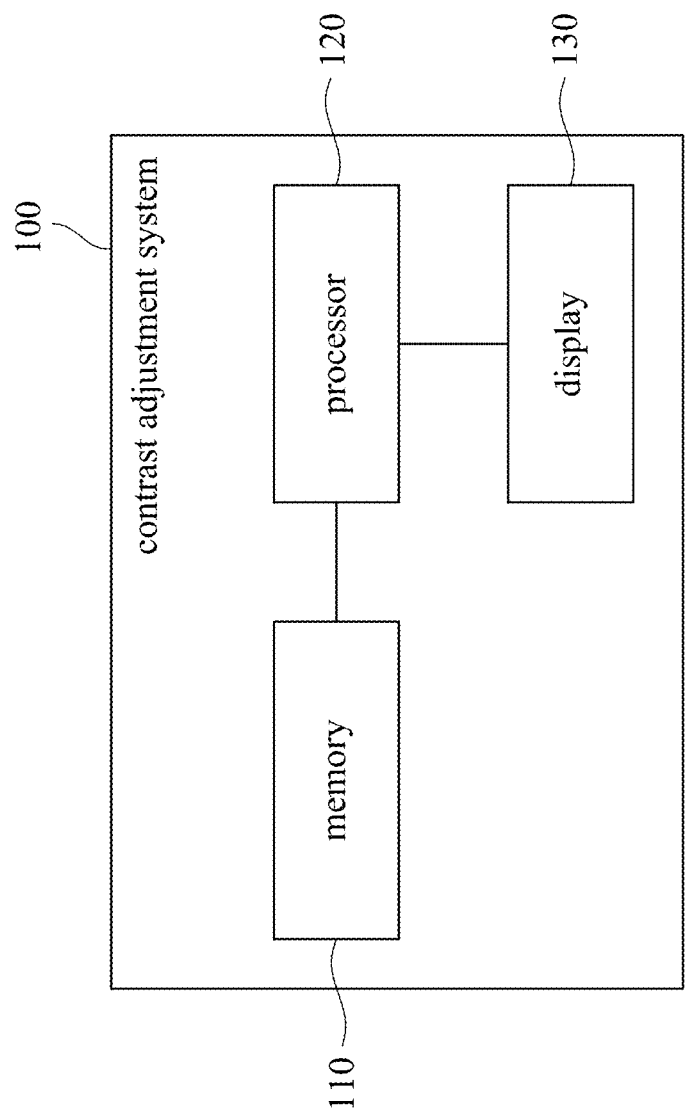
FIG. 1 is a schematic diagram showing a contrast adjustment system according to one embodiment of present disclosure.

FIG. 1 is a schematic diagram showing a contrast adjustment system according to one embodiment of present disclosure. In some embodiments, a contrast adjustment system 100 includes a memory 110 and a processor 120. The processor 120 is electrically coupled to the memory 110. In some embodiments, the processor 120 can include, but not limited to, a single processing circuit or an integration of multiple microprocessors. The memory 110 can be a computer readable medium, including volatile and non-volatile internal/external memory.

In some embodiments, the processor 120 can access at least one instruction from the memory 110. The at least one instruction is related to a contrast adjustment method. The processor 120 can be configured to execute the instruction to perform the contrast adjustment method. For better understandings of operations of the processor 120, detail steps of the contrast adjustment method are explained in the following paragraphs with figures.

In some embodiments, the contrast adjustment system 100 can further include a display 130. While the processor 120 is performing the contrast adjustment method, the processor 120 can output corresponding images via the display 130 so that the user can watch these images on the display 130.

It is noted that the above embodiments are exemplary but not intended to limit the scope of present disclosure. In some embodiments, the contrast adjustment system 100 can include other input devices or output devices for the users or other systems to control the operations of the contrast adjustment system 100. The present discourse is not limited to specific values or ranges shown in given examples. The present disclosure can be implemented with or without some specific details provided in some embodiments.

Figure 2:
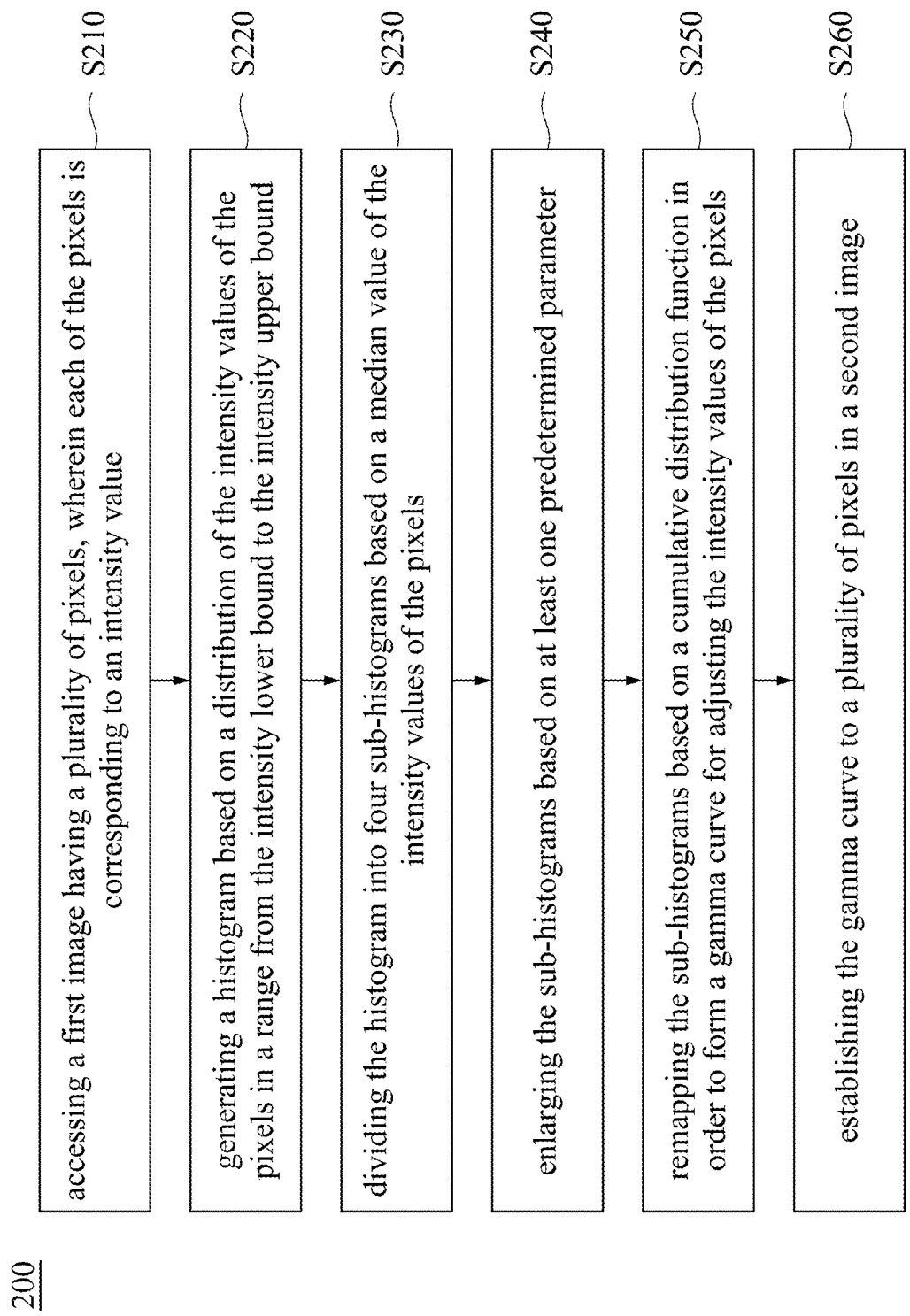
FIG. 2 is a flow chart showing a contrast adjustment method according to one embodiment of present disclosure.

FIG. 2 is a flow chart showing a contrast adjustment method according to one embodiment of present disclosure. In some embodiments, a contrast adjustment method 200 can be performed by the contrast adjustment system 100 of FIG. 1. Reference is also made to the embodiments of FIG. 1. In the embodiment, details of the contrast adjustment method 200 performed by the contrast adjustment system 100 are described in the following paragraphs.

Step S210: a first image having a plurality of pixels is accessed, in which each of the pixels is corresponding to an intensity value.

In some embodiments, in the contrast adjustment system 100 of FIG. 1, the processor 120 can access at least one image from the memory 110 (or other memories). The processor 120 can display the images via the display 130. In some embodiments, the image accessed by the processor 120 is a single frame of a video stream.

In some embodiments, the image includes pixels. Each pixel corresponds to an intensity value. In general, the intensity value is defined in an intensity interval ranging from an intensity lower bound (value: 0) to an intensity upper bound (value: 255). Such intensity values of 0-255 can be used to represent a gray scale of each pixel. When the intensity value of a pixel is 0, a color of the pixel corresponds to black. When the intensity value of a pixel is 255, the color of the pixel corresponds to white.

It is understood that the pixels in the image may correspond to the same or different intensity values. The differences between these intensity values can show a contrast of the image.

Step S220: a histogram is generated based on a distribution of the intensity values of the pixels in a range from the intensity lower bound to the intensity upper bound.

In some embodiments, the processor 120 can execute a statistic process on the image to establish a pixel count according to the intensity values. The statistic process is for counting numbers of pixels having same or different intensity values in the image. For example, in some embodiments, a result of the statistic process can be shown: a number of pixels having an intensity value of 0 is 25, a numbers of pixels having an intensity value of 2 is 120, . . . , a number of pixels having an intensity value of 255 is 46, etc.

Figure 3:
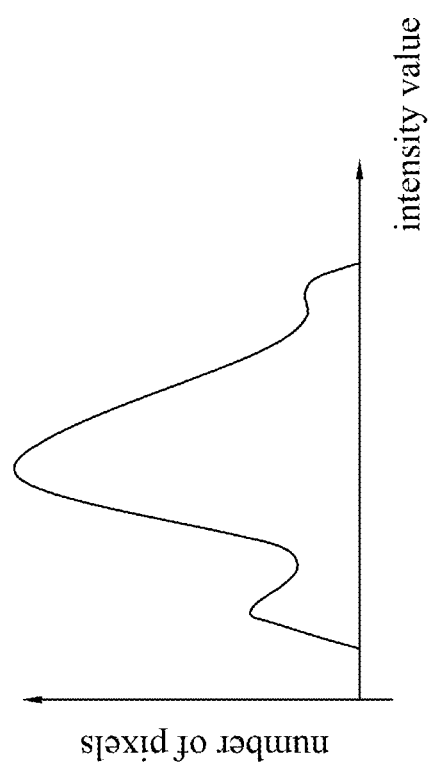
FIG. 3 is a schematic diagram showing histograms according to some embodiments of present disclosure.

In some embodiments, the result of the statistic process can be visualized in a histogram. For better understandings, reference can be made to FIG. 3. FIG. 3 is a schematic diagram showing a histogram according to some embodiments of present disclosure. As shown in FIG. 3, a horizontal axis of the histogram represents the intensity values and a vertical axis of the histogram represents the number of pixels. The histogram can preferably shows a distribution of the intensity values of the pixels in the image. In some embodiments, in order to reduce buffering capacity required for the calculation, the processor 120 can generate the histogram with lower sampling rates and lower statistic accuracies.

In some embodiments, the processor 120 can lower the sampling rate to one of each four pixels along a height or a width of the image and reduce the statistic accuracy of the histogram to one-fourth. In other words, the statistic process gathers the intensity values of each four pixels as one statistic value. In this way, the required buffer for the calculation can be downsized into one out of sixteen (¼*¼) when comparing to the calculation with original sampling rate and statistic accuracy. In particular, in some embodiments, the processor 120 can divide the horizontal axis of the histogram into multiple intervals each with four intensity value units (e.g., 0-3, . . . , 252-255). With a single sampling, the processor 120 can process four pixels along the height or the width of the image. The intensity values of the four pixels can be aggregated into one value. A count of the numbers of pixels can be established based on the divided intervals along the horizontal axis.

Step S230: the histogram is divided into four sub-histograms based on a median value of the intensity values of the pixels.

In some embodiments, the processor 120 can calculate a median value of all the intensity values in the image. The median value can be a mean or a median of all these intensity values. It is noted that, in some embodiments, the median is a value to which a 50th percentile, starting from pixel(s) corresponding to a smallest intensity value (not necessarily 0), of the number of pixels correspond.

In some embodiments, the processor 120 can detect an existence of a region of interest in the image. The region of interest is a region marked/selected by the user or the system based on some specific logics, such as, but not limited to, human face, animals, vehicles, etc. In some embodiments, if the processor 120 can confirm the existence of the region of interest, the processor 120 can determine the median value based on the intensity values of the pixels inside the region of interest instead of the intensity values of all the pixels in the image. Such determination of the median value allows the contrast adjustment method of some embodiments of the present disclosure to be dynamically adapted to regions of interest, in order to provide a better contrast improvement.

In some embodiments, the processor 120 can further calculate a first mean of the median value and the intensity lower bound (i.e., value 0) and calculate a second mean of the median value and the intensity upper bound (i.e., value 255). The first mean, the median value, and the second mean can be used to substantially divide the histogram into four sub-histograms. For better understandings, reference can be made to FIG. 4A. FIG. 4A is a schematic diagram showing histograms according to some embodiments of present disclosure. As illustrated in FIG. 4A, the processor 120 can divide the histogram of FIG. 3 into four sub-histograms by using a first mean AV1, a median value M, a second mean AV2 as lines of division. The four sub-histograms are, from left side to right side, referred to as first to fourth sub-histograms.

Step 240: the sub-histograms are enlarged based on at least one predetermined parameter.

In some embodiments, the processor 120 can enlarge these sub-histograms based on at least one predetermined offset parameter, in order to widen the areas of the sub-histograms in the entire intensity interval (i.e., the interval from 0-255). In some embodiments, the processor 120 can deduct a first predetermined parameter from a minimum intensity value of the first sub-histogram (i.e., the minimum intensity value of the image), in order to generate a new minimum intensity value. A second predetermined parameter can be added to a maximum intensity value of the fourth sub-histogram (i.e., the maximum intensity value of the image) to generate a new maximum intensity value.

In some embodiments, if the new minimum intensity value is calculated to be lower than 0, the processor 120 can alter the new minimum intensity value to 0. If the new maximum intensity value is calculated to be higher than 255, the processor 120 can alter the new maximum intensity value to 255. With this alteration, a sub-histogram enlargement that exceeds the entire intensity interval is prevented from being applied by the processor 120.

Figure 4B:
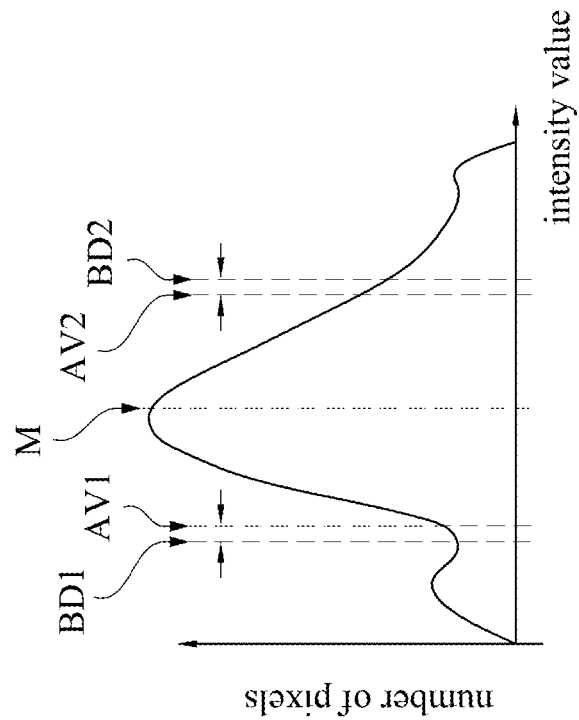
Figure 4A:
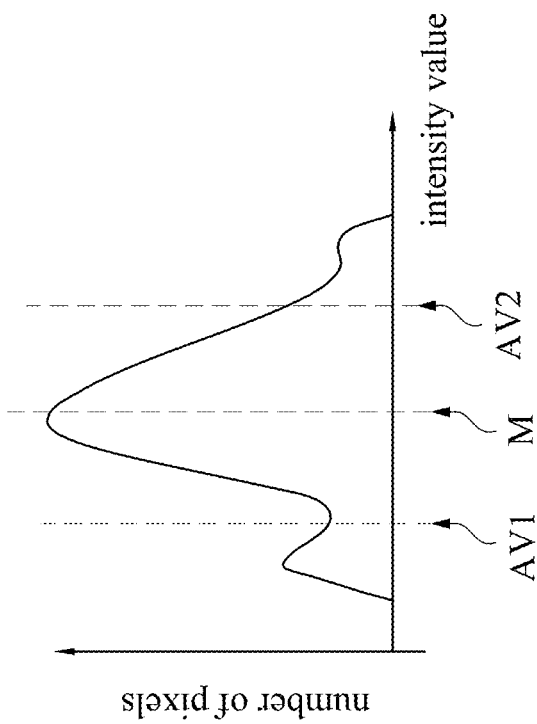

For better understandings, reference can be made to FIG. 4B. FIG. 4B is a schematic diagram showing histograms according to some embodiments of present disclosure. As shown in FIG. 4B, the processor 120 can generate the new minimum intensity value and the new maximum intensity value based on the mentioned step. The minimum intensity value is moved closer to the intensity lower bound, and the maximum intensity values is moved closer to the intensity upper bound.

Correspondingly, in some embodiments, the processor 120 can deduct half of the first predetermined parameter from the first mean, in order to generate a first division value BD1. The first division value BD1 provides a line for dividing the first sub-histogram and the second sub-histogram in the adjustment process. Half of the second predetermined parameter can be added to the second mean to generate a second division value BD2. The second division value BD2 provides a line for dividing the third sub-histogram and the fourth sub-histogram in the adjustment process.

After the adjustment process is performed, fourth intervals to which where the new four sub-histograms correspond are given as the following. The adjusted first sub-histogram is in an interval from the intensity lower bound to the first division value BD1 (the new minimum intensity value is in this interval). The adjusted second sub-histogram is in an interval from the first division value BD1 and the median value M. The adjusted third sub-histogram is in an interval from the median value M and the second division value BD2. The adjusted fourth sub-histogram is in an interval from the second division value BD2 to the intensity upper bound (the new maximum intensity value is in this interval).

In some embodiments, the processor 120 can equalize and remap the sub-histograms according to the first division value BD1 and the second division value BD2, in order to enlarge the sub-histograms in the range from the intensity lower bound to the intensity upper bound. That is, the processor 120 can expand the four new sub-histograms in the new intervals according to the percentages that each of the four original sub-histograms taken in the original intervals. For better understandings, reference can be made to FIG. 4B. FIG. 4B shows an equalization result of the remapped sub-histograms according to the original sub-histograms of FIG. 4A. It is noted that, according to the theory of just noticeable difference (JND), the median value is relatively close to the median of the entire intensity interval. Accordingly, changes corresponding to the two sub-histograms adjacent to the median value are more likely to be observed with bare eye. Hence, an enlargement of the sub-histograms using the median value can make the contrast improvement of the adjusted image to be noticed by human better.

Figure 5:
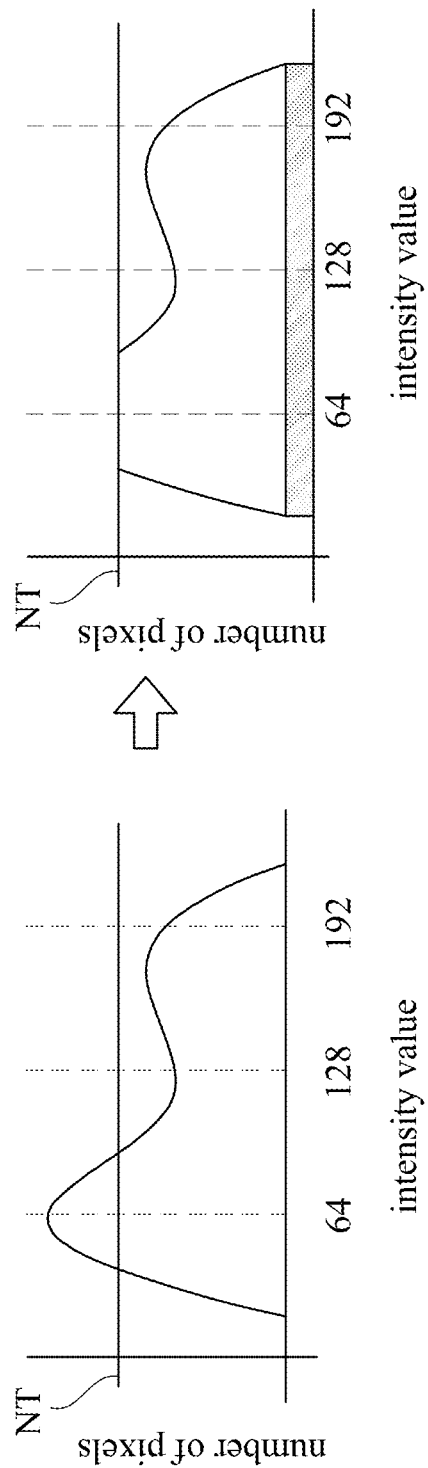

In some embodiments, the processor 120 can access a count threshold and delete some regions of the sub-histograms that exceed the count threshold. For instance, if the count threshold were set to 2000, in the intensity sub-histograms, some regions showing a count that exceeds 2000 pixels would be removed. For better understandings, referring to FIG. 5. As shown in FIG. 5, in the sub-histograms, the regions above a line of the count threshold NT are removed. A number of pixels corresponding to the number being removed can be accumulated at the bottom of the sub-histograms.

Step S250: the sub-histograms are remapped based on a cumulative distribution function, in order to form a gamma curve for adjusting the intensity values of the pixels.

In some embodiments, the processor 120 can apply a cumulative distribution function (CDF) to adjust the intensity values in the sub-histograms to adjusted intensity values, in order to generate a gamma curve for remapping the intensity values. It is noted that the cumulative distribution function is a function of map that takes an original intensity value from the sub-histograms as an input and generate a new intensity value as an output. Through the cumulative distribution function, the original intensity value can be transformed into the new intensity value according to its percentage in the sub-histograms. In some embodiments, the function can be represented below:

$$\text{remapped } intensity_{(i)} = \frac{\sum hist_{(start-i)}}{\sum hist_{(start-end)}} \times (end - start) + start$$

In the function, "$\Sigma hist(range)$" represents a aggregated number of pixels in a specific range of a sub-histogram. "i" represents the original intensity value. "start" represents the lower boundary of the sub-histogram. "end" represents the upper boundary of the sub-histogram. "remapped intensity (i)" indicates to input i into the function of map. Therefore, the above function can be understood as follows. An aggregated probability is calculated from the minimum intensity to the intensity value i in the sub-histogram. The aggregated probability is multiplied by a width of the sub-histogram. A value of the lower boundary of the sub-histogram is added to the result of multiplication, in order to obtain the new intensity value corresponding to the original intensity value i. The aggregated probability can be considered a ratio of the area (i.e., the number of pixels) accumulated from the lower boundary of the sub-histogram to the intensity value i and the entire area of the sub-histogram (i.e., the total number of pixels). The width of the sub-histogram can be calculated by deducting the value of the lower boundary from the value of the upper boundary of the sub-histogram.

Figure 6A:
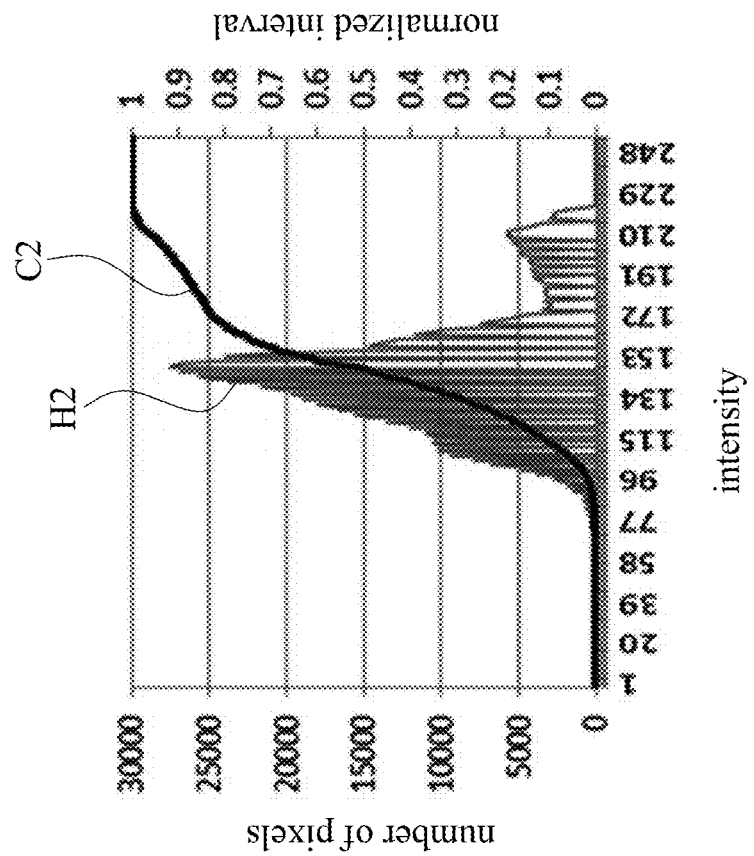
FIGS. 6A-6B are schematic diagrams for comparing histograms with cumulative distribution functions according to some embodiments of present disclosure.
Figure 6B:
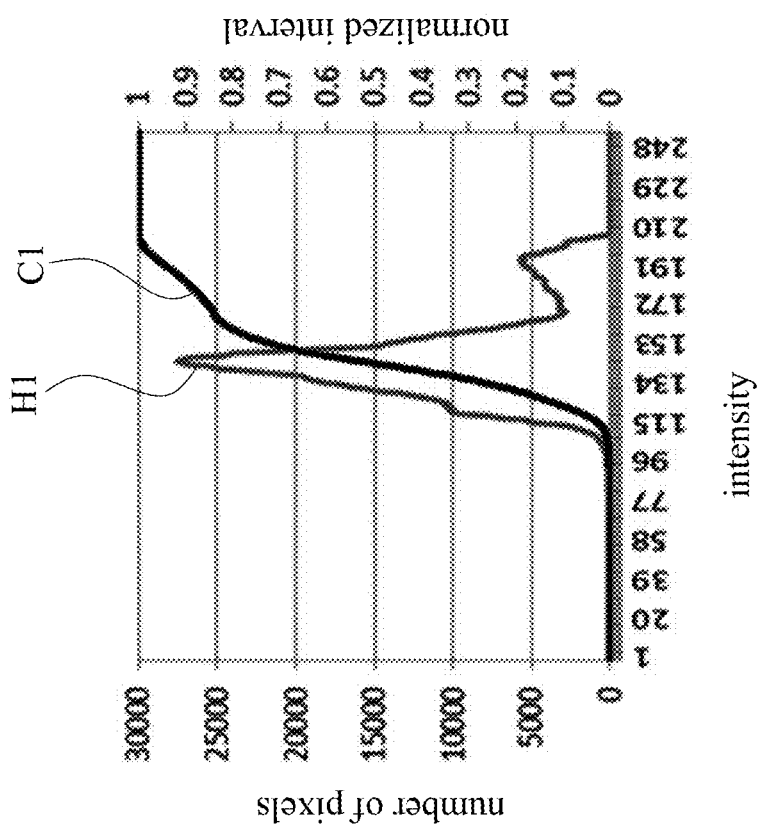

For better understandings, reference can be made to FIGS. 6A-6B. FIG. 6A shows a case of comparison between a histogram H1 and a cumulative distribution function C1 without the contrast adjustment method of present disclosure. FIG. 6B shows a case of comparison between a histogram H2 and a cumulative distribution function C2 with the contrast adjustment method of present disclosure. It can be seen that the case with the contrast adjustment method of present disclosure shows a better comparison between the histogram and the cumulative distribution function.

In some embodiments, when the processor 120 obtains the gamma curve, the processor 120 can access a predetermined maximum slope and a predetermined minimum slope and further determine whether the slopes corresponding to some segments of the gamma curve are larger than the predetermined maximum slope or smaller than the predetermined minimum slope. If the slopes corresponding to some segments of the gamma curve are larger than the predetermined maximum slope, the processor 120 can adjust these slopes to the value of the predetermined maximum slope. If the slopes corresponding to some segments of the gamma curve are smaller than the predetermined minimum slope, the processor 120 can adjust these slopes to the value of the predetermined minimum slope.

Figure 7A:
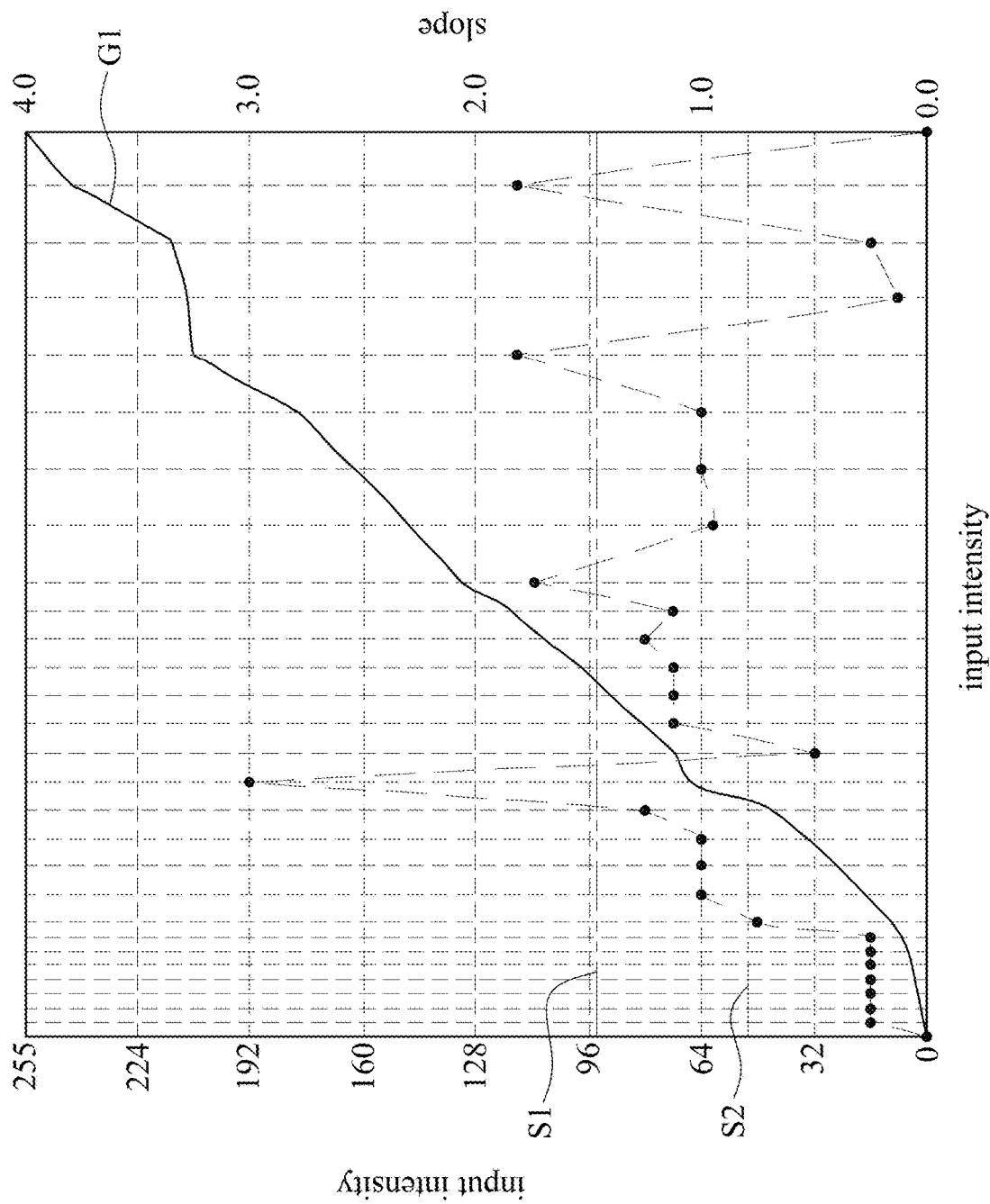
FIGS. 7A-7B are schematic diagrams showing gamma curves according to some embodiments of present disclosure.
Figure 7B:
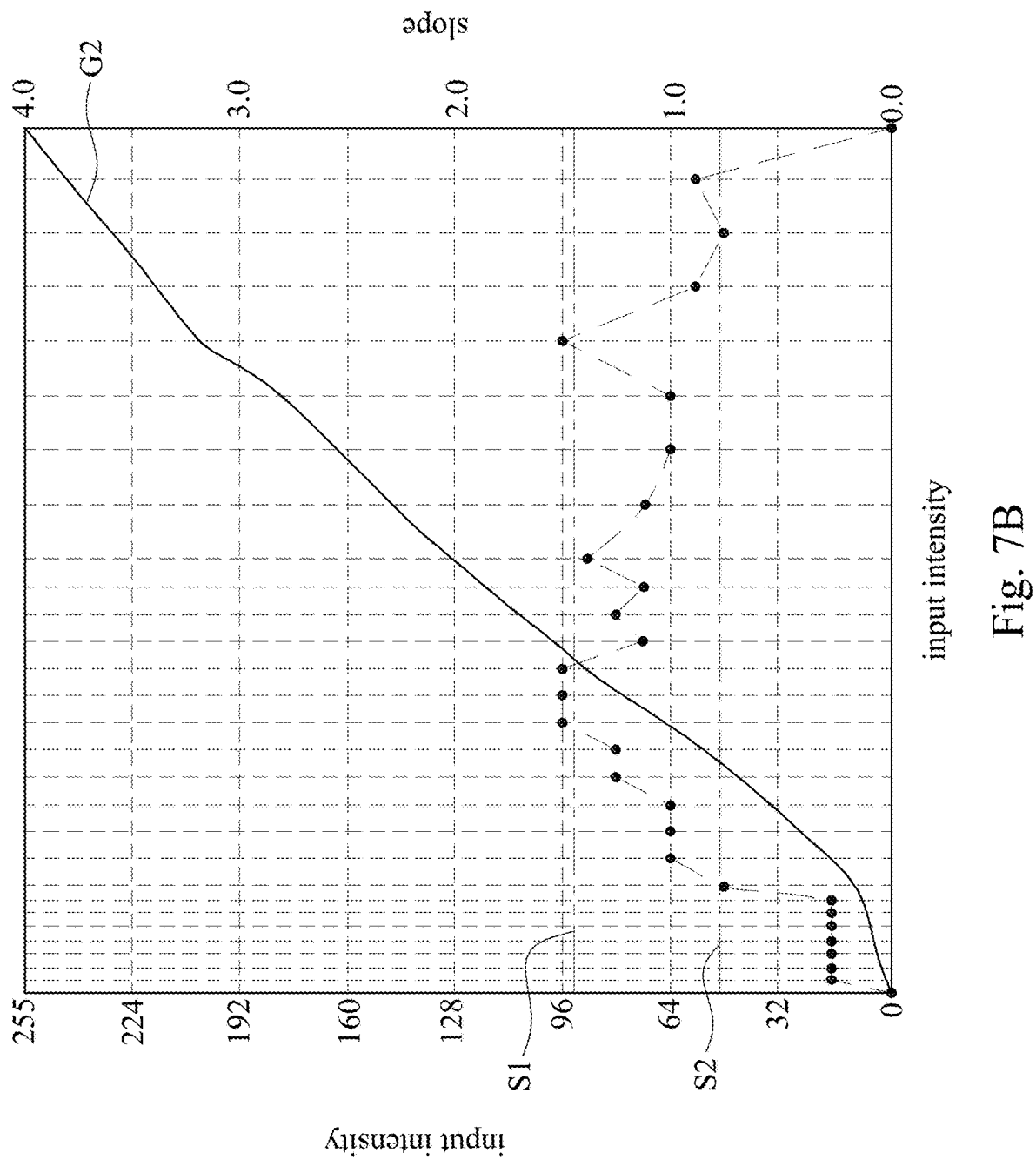

For better understandings, referring to FIGS. 7A-7B. FIGS. 7A-7B are schematic diagrams showing gamma curves and slopes of the segments according to some embodiments of present disclosure. In these figures, a threshold line S1 representing the predetermined maximum slope and a threshold line S2 representing the predetermined minimum slope are illustrated. As shown in FIG. 7A, the processor 120 determines the slopes corresponding to some segments (those marked with circles) of the obtained gamma curve G1 are larger than the predetermined maximum slope or smaller than the predetermined minimum slope. As shown in FIG. 7B, the processor 120 can adjust the slopes of these segments to the predetermined maximum slope or the predetermined minimum slope. In this way, the slopes of the segments of the adjusted gamma curve are controlled between the threshold line S1 and the threshold line S2. The process can be used to smooth precipitous segment(s) of the gamma curve, so that a discontinuousness of the adjusted image can be prevented.

Figure 8:
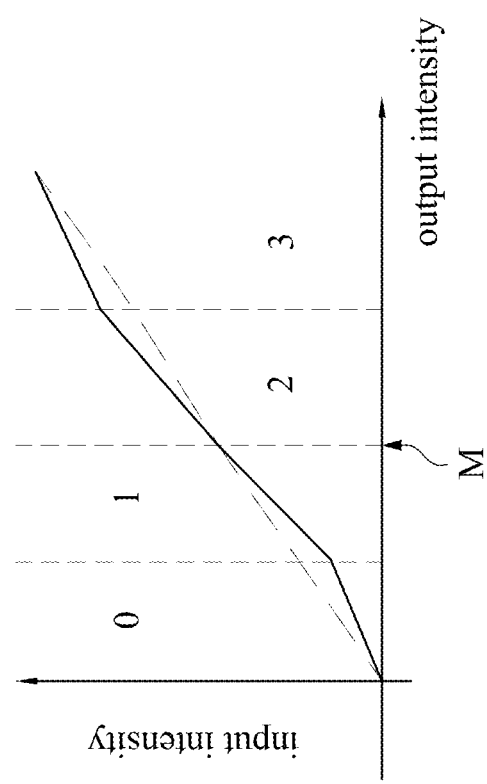

In some embodiments, the processor 120 can apply a linear stretching to the gamma curve to enhance slopes of the segments adjacent to the median value. For better understandings, reference is made to FIG. 8. As shown in FIG. 8, the interval of the entire gamma curve can be substantially divided into four zones based on the median value M shown in FIGS. 4A-4B. The four zones are zone 0 (which has intensity values from 0 to M/2), zone 1 (which has intensity values from M/2 to M), zone 2 (which has intensity values from M to (255−M/2)), and zone 3 (which has intensity values from (255−M/2) to 255).

In some embodiments, the processor 120 can apply the linear stretching according to at least one linear function. The calculation of the linear function are: multiplying the slope of the gamma curve segment in zone 0 by a value of (1−a); multiplying the slope of the gamma curve segment in zone 1 by a value of (1+a); multiplying the slope of the gamma curve segment in zone 2 by a value of (1+b); and multiplying the slope of the gamma curve segment in zone 3 by a value of (1−b). In the calculation, a and b are predetermined slope parameters that can be set by the users or the system. Such stretching can enhance a slope difference of the gamma curve between the left side of the median values M and the right side of the median values M.

Step S260: the gamma curve is applied to pixels in a second image.

In some embodiments, the processor 120 can access another image, such as a next frame of the video stream. The processor 120 can use the gamma curve to remap intensities of the pixels in the image, in order to increase the contrast of the image. In some embodiments, the processor 120 can apply the contrast adjustment method to each frame and then the next frame in the video stream.

Figures 9A, 9B:
FIGS. 9A-9B are schematic diagrams showing experiment results of present disclosure.

According to foregoing embodiments, the present disclosure provides a contrast adjustment system and a contrast adjustment method that can effectively improve the contrast of images. For better understandings, reference can be made to FIGS. 9A-9B, which are schematic diagrams showing experiment results of present disclosure. FIG. 9A shows an image before the contrast adjustment method is applied. FIG. 9B shows an image after the contrast adjustment method is applied. Apparently, the image of FIG. 9B shows an improved contrast in comparison with the image of FIG. 9A.

What is claimed is:

1. A contrast adjustment system, comprising:
a memory, configured to store at least one instruction; and
a processor, coupled to the memory, the processor configured to access and execute the at least one instruction to:
access a first image having a plurality of first pixels, wherein the plurality of first pixels are corresponding to a plurality of intensity values, respectively;
generate a histogram based on a distribution of the plurality of intensity values in a range from an intensity lower bound to an intensity upper bound;
divide the histogram into four sub-histograms based on a median value of the plurality of intensity values;
enlarge the four sub-histograms based on at least one predetermined parameter;
remap the four sub-histograms based on a cumulative distribution function, in order to form a gamma curve for adjusting the plurality of intensity values; and apply the gamma curve to a plurality of second pixels in a second image.

2. The contrast adjustment system of claim 1, wherein the processor is further configured to execute the at least one instruction to:
detect a region of interest in the first image; and
calculate the median value based on a plurality of first intensity values among the plurality of intensity values, wherein the plurality of first intensity values are corresponding to the region of interest.

3. The contrast adjustment system of claim 1, wherein the processor is further configured to execute the at least one instruction to:
calculate a first mean of the median value and the intensity lower bound;
calculate a second mean of the median value and the intensity upper bound; and
divide the histogram into the four sub-histograms based on the first mean, the median value and the second mean.

4. The contrast adjustment system of claim 3, wherein the processor is further configured to execute the at least one instruction to:
deduct a first predetermined parameter of the at least one predetermined parameter from the first mean, in order to generate a first division value;
add a second predetermined parameter of the at least one predetermined parameter to the second mean, in order to generate a second division value; and
equalize and remap the four sub-histograms based on the first division value and the second division value, in order to enlarge the four sub-histograms in the range from the intensity lower bound to the intensity upper bound.

5. The contrast adjustment system of claim 4, wherein the processor is further configured to execute the at least one instruction to:
access a count threshold;
delete a plurality of regions of the four sub-histograms that exceed the count threshold; and
remap the four sub-histograms after deletion based on the cumulative distribution function, in order to form the gamma curve.

6. The contrast adjustment system of claim 1, wherein the first image and the second image are successive frames in a video stream.

7. The contrast adjustment system of claim 1, wherein median value is a median or an average of the intensity values of the plurality of first pixels.

8. The contrast adjustment system of claim 1, wherein the processor is further configured to execute the at least one instruction to:
access a predetermined maximum slope and a predetermined minimum slope;
determine whether a first slope corresponding to a first segment of the gamma curve is larger than the predetermined maximum slope;
adjust the first slope to the predetermined maximum slope if the first slope corresponding to the first segment is larger than the predetermined maximum slope;
determine whether a second slope corresponding to a second segment of the gamma curve is smaller than the predetermined minimum slope; and
adjust the second slope to the predetermined minimum slope if the second slope corresponding to the second segment is smaller than the predetermined minimum slope.

9. A contrast adjustment method, performed by a processor accessing at least one instruction from a memory and executing the least one instruction, the contrast adjustment method comprising:
- accessing a first image having a plurality of first pixels, wherein the plurality of first pixels are corresponding to a plurality of intensity values, respectively;
- generating a histogram based on a distribution of the plurality of intensity values in a range from an intensity lower bound to an intensity upper bound;
- dividing the histogram into four sub-histograms based on a median value of the plurality of intensity values;
- enlarging the four sub-histograms based on at least one predetermined parameter;
- remapping the four sub-histograms based on a cumulative distribution function in order to form a gamma curve for adjusting the plurality of intensity values; and
- applying the gamma curve to a plurality of second pixels in a second image.

10. The contrast adjustment method of claim 9, further comprising:
- detecting a region of interest in the first image; and
- calculating the median value based on a plurality of first intensity values among the plurality of intensity values, wherein the plurality of first intensity values are corresponding to the region of interest.

11. The contrast adjustment method of claim 9, further comprising:
- calculating a first mean of the median value and the intensity lower bound;
- calculating a second mean of the median value and the intensity upper bound; and
- dividing the histogram into the four sub-histograms based on the first mean, the median value and the second mean.

12. The contrast adjustment method of claim 9, further comprising:
- deducting a first predetermined parameter of the at least one predetermined parameter from the first mean in order to generate a first division value;
- adding a second predetermined parameter of the at least one predetermined parameter to the second mean in order to generate a second division value; and
- equalizing and remapping the four sub-histograms based on the first division value and the second division value, in order to enlarge the four sub-histograms in the range from the intensity lower bound to the intensity upper bound.

13. The contrast adjustment method of claim 9, further comprising:
- accessing a count threshold;
- deleting a plurality of regions of the four sub-histograms that exceed the count threshold; and
- remapping the four sub-histograms after deletion based on the cumulative distribution function in order to form the gamma curve.

14. The contrast adjustment method of claim 9, wherein the first image and the second image are successive frames in a video stream.

15. The contrast adjustment method of claim 9, wherein the median value is a median or an average of the intensity values of the plurality of first pixels.

16. The contrast adjustment method of claim 9, further comprising:
- accessing a predetermined maximum slope and a predetermined minimum slope;
- determining whether a first slope corresponding to a first segment of the gamma curve is larger than the predetermined maximum slope;
- adjusting the first slope to the predetermined maximum slope if the first slope corresponding to the first segment is larger than the predetermined maximum slope;
- determining whether a second slope corresponding to a second segment of the gamma curve is smaller than the predetermined minimum slope; and
- adjusting the second slope to the predetermined minimum slope if the second slope corresponding to the second segment is smaller than the predetermined minimum slope.

* * * * *